United States Patent [19]

Hwang

[11] Patent Number: 4,942,691
[45] Date of Patent: Jul. 24, 1990

[54] FISHLINE STORING BOX

[76] Inventor: Jin-Tsair Hwang, No. 5, 97 Lane, Ching- hou Street, Taipei, Taiwan

[21] Appl. No.: 254,580

[22] Filed: Oct. 7, 1988

[51] Int. Cl.$^5$ .............................................. A01K 97/06
[52] U.S. Cl. ........................................ 43/54.1; 43/57.1
[58] Field of Search ...................... 43/54.1, 57.1, 57.2, 43/57.3; 206/315.11; 220/23.6; 224/920; 242/85.1, 96

[56] References Cited

U.S. PATENT DOCUMENTS

| | | | |
|---|---|---|---|
| 920,663 | 5/1909 | Schaney | 43/57.1 |
| 2,553,097 | 5/1951 | Lampe | 43/54.1 |
| 2,743,546 | 5/1956 | Crist | 43/54.1 |
| 2,785,869 | 3/1957 | Howard | 43/54.1 |
| 2,814,904 | 12/1957 | Reidall | 43/54.1 |
| 3,008,664 | 11/1961 | McCormick | 43/54.1 |
| 3,039,226 | 6/1962 | Bagdonas | 43/57.2 |
| 3,377,737 | 4/1968 | Campbell | 43/57.1 |
| 3,486,267 | 12/1969 | Hitre | 43/57.3 |
| 3,991,507 | 11/1976 | Bart | 43/54.1 |
| 4,702,035 | 10/1987 | Palm | 43/57.1 |

FOREIGN PATENT DOCUMENTS

| | | | |
|---|---|---|---|
| 494344 | 7/1953 | Canada | 43/57.1 |
| 1087396 | 2/1955 | France | 43/57.1 |

Primary Examiner—Kurt Rowan
Attorney, Agent, or Firm—Morton J. Rosenberg; David I. Klein

[57] ABSTRACT

A fishline storing box comprising a cover, a main body and a pair of magnets. The cover is provided with a pair of engaging holes each of which has a stop. The main body includes a ring-shaped upper plate having a pair of hooks to engage with the engaging holes of the cover, a base plate and a hollow cylinder connected between the upper plate and the base plate. The upper plate has a plurality of ears inwardly extending to allow a fishline engage therewith and a plurality of lowered surfaces and V-shaped grooves to allow the fishline pass therethrough. The base plate is provided with a plurality of recesses at upper surface, a pair of grooves to receive the magnets at lower surface and a plurality of gaps formed and communicated between the respective recess and groove, thereby a fish hook of shorter tail line is disposed in the recess and a fish hook of long tail line is inserted into the gap so that both of the fish hooks are attracted by the magnets.

1 Claim, 4 Drawing Sheets

FISHLINE STORING BOX

BACKGROUND OF THE INVENTION

The present invention relates to a fishline storing box, particular to a box which is easily carried and safely stores a fishline to prevent the fishline from being damaged.

A fishline is removed from a fishpole when unused. To store or carry the fishline, a rectangular-shaped wooden plate is used. Conventional rectangular-shaped wooden plate is provided with a groove, so that a fishline can be reeled on the plate and a fish hook which engages at the end of the fishline is inserted into the groove. Generally, the fishline comprises a main line and two tail lines. One end of the main line engages with a fish pole and the other end engages with the two tail lines. The tail lines are of different length. Obviously, when reeling the fishline onto the conventional wooden plate, the fishline is probably folded at each corner of the wooden plate and damaged. Moreover, the tail lines are tangled with each other because the length of each tail line is different. Further, there are a lot of small articles, such as bobs and sinkers, which mush be carried together with the fishline and fish pole. However, conventional wooden plate is provided with no further space to contain the small articles.

It is, therefore, an objective of the present invention is to provide a fishline storing box which can obviate and mitigate the above-mentioned drawbacks.

SUMMARY OF THE INVENTION

A main objective of the present invention is to provide a fishline storing box which comprises a hollow cylinder to allow a fishline be reeled thereon, a pair of magnets to attract fish hooks of the fishline and a plurality of ears to allow the fishline hanged thereon.

Another objective of the present invention is to provide a fishline storing box which comprises a base plate and a cover respectively engaging at both ends of the hollow cylinder, so that the small articles, such as bobs and sinkers, can be stored in the hollow cylinder.

A further objective of the present invention is to provide a fishline storing box which comprise a pair of holes on the base plate and a pair of hooks on an upper plate, so that a box can stack on a further stack.

The novel features which are characteristics of the invention together with further objectives and advantages there of will be better understood from the following description considered in connection with the accompanied drawings and in which a preferred embodiment of the invention is illustrated by way of example. It is to be expressly understood, however, that the drawings are for the purposes of illustration and description only and are not intend as a definition of the limits of the invention.

DETAILED DESCRIPTION OF THE DRAWINGS

Figure 1:
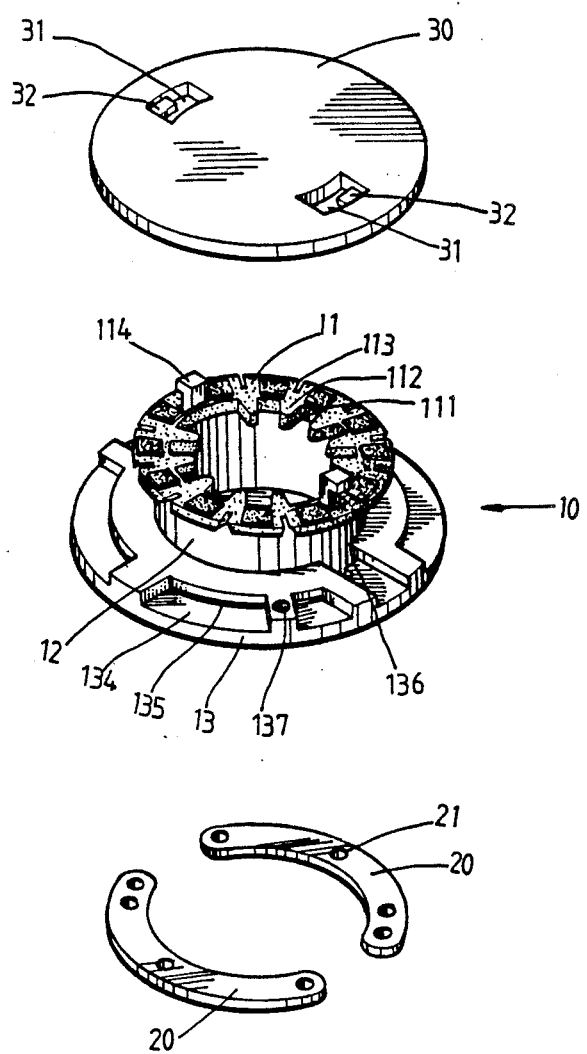
FIG. 1 is an exploded view of a fishline storing box according to the present invention.
Figure 2:
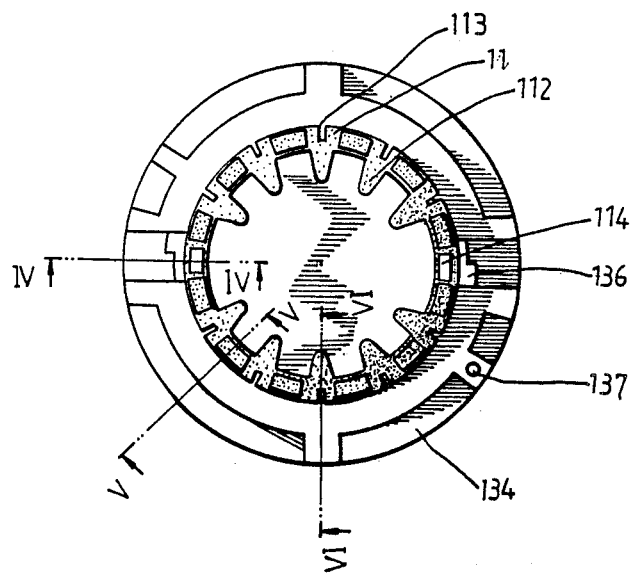
FIG. 2 is a top plane view of the fishline storing box of FIG. 1 with a cover removed.
Figure 3:
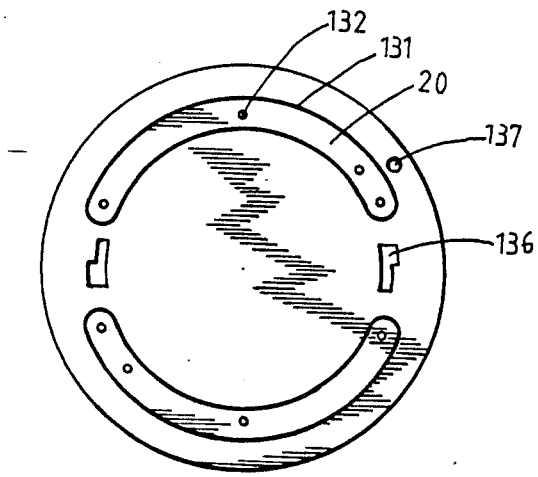
FIG. 3 is a bottom plane view of the fishline storing box of FIG. 2.
Figure 4:
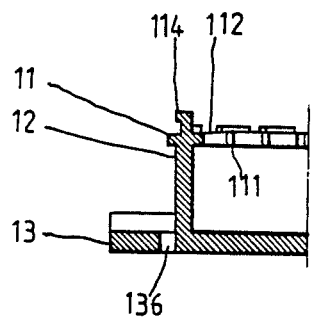
FIG. 4 is a partial cross-sectional view taken along line IV—IV of FIG. 2.
Figure 5:
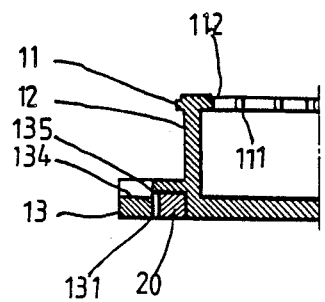
FIG. 5 a partial cross-sectional view taken along line V—V of FIG. 2.

Referring to FIG. 1 and 2, there is shown a fishline storing box according to the present invention which comprises a main body 10, a pair of magnets 20 and a cover 30. The main body 10 comprises an upper plate 11, a hollow cylinder 12 and a base plate 13. As can be better seen in FIG. 2, 3, 4 and 5, the upper plate 11 is a ring-shaped plate which provides a plurality of inwardly extending ears 111. The upper plate 11 has a plurality of lower surfaces 112 which are aligned with the ears 111 respectively. Each lower surface 112 has a V-shaped groove 113 at the outer rim thereof. A pair of hooks 114 upwardly entends from the upper plate 11, as shown in FIGS. 1 and 4.

Figure 6:
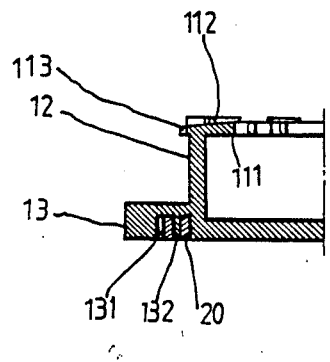
FIG. 6 is a partial cross-sectional view taken along line VI—VI of FIG. 2; nd

The hollow cylinder 12 is connected to the upper plate 11 at one end and to the base plate 13 at the other end in order to form a hollow space so that . small articles used for fishing can be received therein. The base plate 13 comprises a pair of grooves 131 formed in a lower surface to receive the magnets 20. A plurality of stem members 132 are located within the grooves 131 as shown in FIG. 6. Each magnet 20 is provided with a plurality of holes 21 which can engage with respective stems 132 of the groove 131 when the magnet 20 is inserted into the groove 131, as shown in FIGS. 3 and 6. The base plate 13 comprises a plurality of recesses 134 at the outer rim of upper surface thereof. The recesses 134 are located adjacent to the grooves 131. Both of the depth of the grooves 131 and the recesses 134 are greater than half thickness of the base plate 13, so that a gap 135 is formed and provides open communication between each groove 131 and each respective recess 134. A pair of engaging holes 136 are arranged on the base plate 13, as shown in FIG. 4, in order to engage with the hooks 114 of another box when more than one box are stacked. The engaging holes 136 of the base plate 13 are aligned with the hooks 114 of the upper plate 11. The base plate 13 has an aperture 137 which can be engaged with an additional means (not shown) used to be carried by a user.

Figure 7:
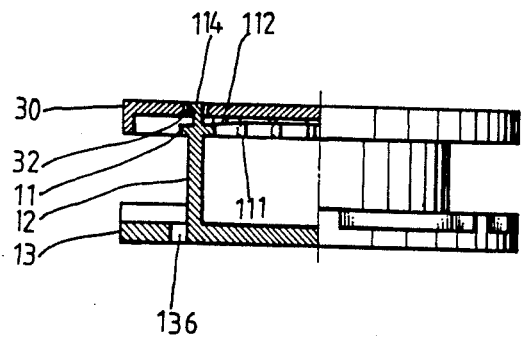
FIGS. 7 and 8 are cross-sectional views of the fishline storing box of FIG. 1 showing that the cover engages with a main body and a magnet inserted into a groove of the main body.
Figure 8:
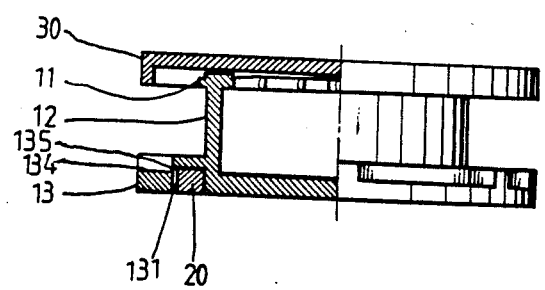

The cover 30 comprises a pair of engaging holes 31 each of which has a stop 32, so that, as can be seen in FIG. 7, the hooks 114 engages with the holes 31 when the cover 30 is mounted on the main body 10 therefore, the small articles stored in the space of the hollow cylinder 12 can be safely contained therein.

It is obvious that the end of main line can be easily formed as a ring and engaged with the ear 111 of the upper plate 11, then the fishline passes through the lower surface 112 and V-shaped groove 113 and reels onto the cylinder 12. Finally, the fish hook engaged in the shorter tail line is disposed in the recess 134 and attracted by the magnet 20. The fish hook engaged in the longer tail line is inserted into the gaps 135 and is also attracted by the magnet 20. The two hooks may be either disposed at the same side of base plate 13 and attracted by the same magnet 20 or disposed at opposite sides of the base plate 13 and attracted by two magnets 20, respectively. The fishline is smoothly, tightly and steadily reeled on the storing box without any danger of damage. The two tail line can never be tangled.

It is known that one fishline storing box can store one fishline. If more than one fishline has to be carried, it needs more than one fishline storing box. It is noted that the base plate 13 of the present invention comprises a pair of engaging holes 136 which can engage with the hooks 114 of the upper plate 11 of another main body 10, so that more than one storing box can be stacked together and easily carried. If the boxes are stacked, all the covers are removed except the uppermost one.

Although this invention has been described with a certain degree of particularity, it is understood that the present disclosure is made by way of example only and that numerous changes in the construction and the combination and arrangement of parts may be resorted to without departing from the spirit and scope of the invention as hereinafter claimed.

I claim:
1. A fishline storing box, comprising:
 a cover having a plurality of engaging holes, each engaging hole being provided with a stop;
 a main body including:
 an upper ring-shaped plate having a plurality of ears extending inwardly, a plurality of lower surfaces each of which is aligned with a respective ear and a plurality of hooks upwardly extending, each of said lower surfaces having a V-shaped groove, each of said hooks being engageable with each of said engaging holes of said cover respectively;
 a hollow cylinder coupled to said upper ring-shaped plate at an upper end thereof; and
 a base plate connected to a lower end of said hollow cylinder to form a containing space, said base plate having a plurality of recesses formed within an outer rim of an upper surface thereof, a plurality of gaps defining an open communication between each recess and a groove formed in said base plate and a plurality of engaging holes which are engageable with the hooks of another main body; and
 a plurality of magnets being received in said grooves respectively.

* * * * *